(12) United States Patent
Heyl et al.

(10) Patent No.: US 12,304,462 B2
(45) Date of Patent: May 20, 2025

(54) METHOD FOR DETECTING AN OBSTACLE ON A ROUTE

(71) Applicant: Robert Bosch GmbH, Stuttgart (DE)

(72) Inventors: Andreas Heyl, Weil der Stadt (DE); Christian Heinzemann, Ludwigsburg (DE); Martin Butz, Steinheim an der Murr (DE); Martin Herrmann, Korntal (DE); Michael Rittel, Markgroeningen (DE); Nadja Schalm, Renningen (DE); Jens Oehlerking, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 225 days.

(21) Appl. No.: 17/844,818

(22) Filed: Jun. 21, 2022

(65) Prior Publication Data

US 2023/0001917 A1  Jan. 5, 2023

(30) Foreign Application Priority Data

Jun. 30, 2021 (DE) .................... 10 2021 206 875.8

(51) Int. Cl.
| | | |
|---|---|---|
| *B60W 30/08* | (2012.01) | |
| *B60Q 5/00* | (2006.01) | |
| *B60W 30/18* | (2012.01) | |
| *G01S 13/931* | (2020.01) | |

(52) U.S. Cl.
CPC ............ *B60W 30/08* (2013.01); *B60Q 5/005* (2013.01); *B60W 30/18* (2013.01); *G01S 13/931* (2013.01)

(58) Field of Classification Search
CPC ....... B60W 30/08; B60W 30/18; B60Q 5/005; G01S 13/931
See application file for complete search history.

(56) References Cited

U.S. PATENT DOCUMENTS

| | | | | |
|---|---|---|---|---|
| 2005/0169530 A1* | 8/2005 | Nakai | .................... | G08G 1/166 |
| | | | | 382/104 |
| 2005/0247513 A1* | 11/2005 | Turner | .................. | B62D 1/286 |
| | | | | 180/444 |
| 2005/0285756 A1* | 12/2005 | Shwak | ............. | G08G 1/096791 |
| | | | | 340/903 |
| 2010/0013615 A1* | 1/2010 | Hebert | .................. | G06V 20/58 |
| | | | | 340/425.5 |

(Continued)

FOREIGN PATENT DOCUMENTS

| | | |
|---|---|---|
| DE | 102006032735 A1 | 1/2008 |
| DE | 102012219631 A1 | 4/2014 |
| DE | 102016208883 A1 | 11/2017 |

*Primary Examiner* — Seth A Silverman
(74) *Attorney, Agent, or Firm* — NORTON ROSE FULBRIGHT US LLP

(57) ABSTRACT

A computer-implemented method for detecting an obstacle on a route ahead of a first vehicle. In the method, information on a second vehicle driving ahead on the route is recorded in the first vehicle by at least one sensor of the first vehicle. In the first vehicle, depending on the recorded information, a computer detects an avoidance maneuver of the second vehicle due to an obstacle or detects that the second vehicle has driven over an obstacle. An obstacle is detected on the route depending on the detected avoidance maneuver or the detection that the vehicle has driven over an obstacle. A measure for protecting the vehicle and/or the obstacle is initiated depending on the detected obstacle.

17 Claims, 4 Drawing Sheets

(56) References Cited

U.S. PATENT DOCUMENTS

| | | | |
|---|---|---|---|
| 2013/0018526 A1* | 1/2013 | Kelly | G01M 17/0078 701/2 |
| 2020/0125088 A1* | 4/2020 | Raichelgauz | G08G 1/16 |
| 2020/0255013 A1* | 8/2020 | Lee | B60Q 1/50 |
| 2021/0129750 A1* | 5/2021 | Nugent | G01S 7/003 |
| 2021/0225162 A1* | 7/2021 | Tao | G08G 1/0145 |
| 2022/0350009 A1* | 11/2022 | Sahin | G01S 7/006 |

* cited by examiner

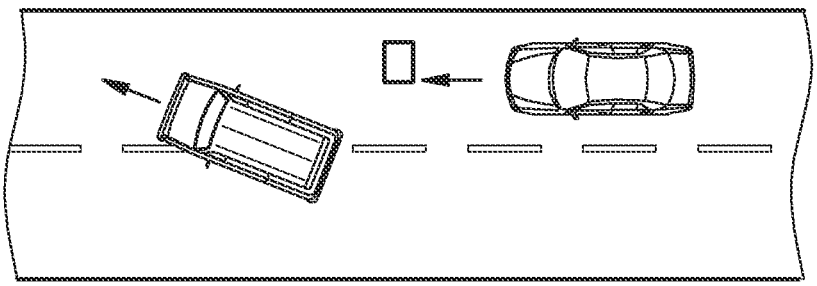
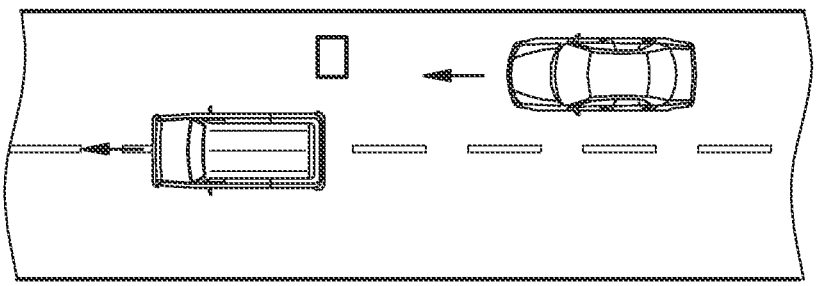
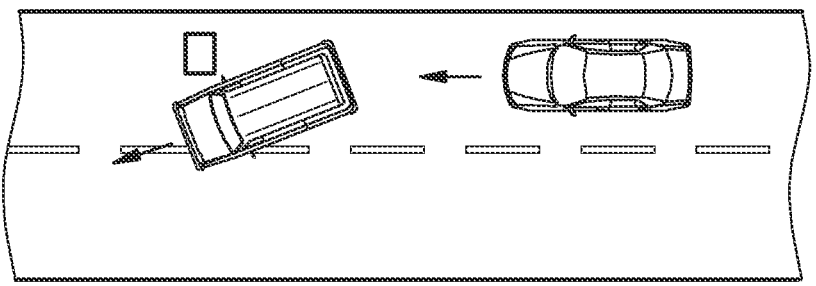
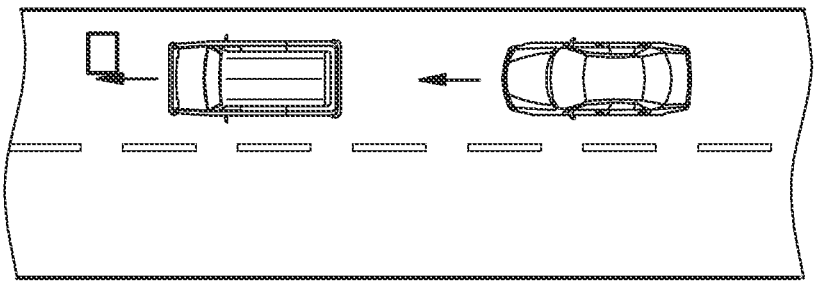
Fig. 2

METHOD FOR DETECTING AN OBSTACLE ON A ROUTE

CROSS REFERENCE

The present application claims the benefit under 35 U.S.C. § 119 of German Patent Application No. DE 10 2021 206 875.8 filed on Jun. 30, 2021, which is expressly incorporated herein by reference in its entirety.

FIELD

The present invention relates to computer-implemented methods for detecting an obstacle on a route ahead of a vehicle, to a computer program configured for that purpose, and to a vehicle comprising a computer program of this kind.

BACKGROUND INFORMATION

German Patent Application No. DE 10 2016 208883 A1 describes a method for locating a pothole. In this case, several pieces of vehicle trajectory information are compared with a piece of reference trajectory information in order to determine a first piece of pothole information. In the process, the piece of reference trajectory information can represent an avoidance trajectory or a trajectory over a pothole.

German Patent Application No. DE 10 2012 219631 A1 describes a method for detecting at least one bump on the roadway. In this case, a bump on the roadway is detected when various pieces of information, from a plurality of datasets, assigned to the same geographical position each represent a locally recorded bump on the roadway. In the process, the bump can be locally recorded by an acceleration sensor or an optical sensor.

German Patent Application No. DE 10 2006 032735 A1 describes a radar sensor for measuring the condition of a roadway.

SUMMARY

The present invention provides a computer-implemented method for detecting an obstacle on a route ahead of a first vehicle. In this context, the obstacle can be roadway damage, in particular a pothole, or an object on a roadway.

In accordance with an example embodiment of the present invention, in the method, information on a second vehicle driving ahead on the route is recorded in the first vehicle by at least one sensor of the first vehicle. In advantageous configurations, various vehicle sensors, in particular environment sensors, for example a camera, a LiDAR, a radar, a microphone, or an ultrasonic sensor, can be used for this purpose.

In the first vehicle, depending on the recorded information, a computer detects an avoidance maneuver of the second vehicle due to an obstacle or detects that the second vehicle has driven over an obstacle.

In particularly preferred configurations of the present invention, the information on the second vehicle can include information on movements of the second vehicle. In particular, at least one pitch motion of the second vehicle can be recorded, which can indicate that the vehicle has driven over an obstacle. In addition, a change to a relative position of the second vehicle in a lane or a yaw motion of the second vehicle, which can indicate an avoidance maneuver due to an obstacle, can be deduced from the recorded information.

An obstacle is detected on the route depending on the detected avoidance maneuver or the detection that the vehicle has driven over an obstacle. In the process, a location of the obstacle can preferably be determined, in particular a distance between the first vehicle and the obstacle or a position of the obstacle in a lane.

A measure for protecting the vehicle or the obstacle is then initiated depending on the detected obstacle. Preferably, the measure includes an automatic steering intervention, an automatic braking intervention, and/or a warning signal to a driver of the first vehicle.

In a first preferred configuration of the present invention, the second vehicle driving ahead is only the vehicle immediately in front of the first vehicle. One advantage of this variant is that the information required for that vehicle can be recorded in a simple and relatively reliable manner.

In another preferred configuration of the present invention, one or more vehicles immediately or further ahead of the first vehicle can be taken into account. Whereas recording the necessary information continuously is more difficult in this case, the method allows an obstacle to be detected earlier and allows any suspicion to be verified by observing a plurality of vehicles.

In an advantageous configuration of the present invention, the first vehicle monitors the second vehicle both for an avoidance maneuver due to an obstacle and to see if it drives over an obstacle. In this example, preferably the obstacle can then also be detected depending on the detected avoidance maneuver and the detection that the vehicle has driven over the obstacle, in particular when the avoidance maneuver is only partly successful.

The above-described method offers the advantage whereby a vehicle can autonomously detect an obstacle that is not visible to it, or is not visible until a late stage, without being dependent on information from other vehicles or from other external units or data sources. In this case, the vehicle can draw a conclusion on the obstacle from the behavior, in particular movements, of one or more vehicles in front, the vehicle observing said behavior using its own vehicle sensors. In particular, in this case the obstacle can be detected even if the vehicle in front did not detect the obstacle itself or did so too late and failed to react or reacted inadequately.

By detecting an obstacle in this way, a measure for protecting the vehicle behind, its passengers, and also the obstacle, where applicable, can be proactively initiated in that vehicle.

The above-described methods can be used in driver-assistance systems of a vehicle or in a vehicle computer of a fully automated vehicle. They are used, for example, in cars, trucks, or motorbikes.

Machine learning methods such as deep learning can be used for the detection of characteristic movements of the vehicle in front that indicate that the vehicle has driven around or over an obstacle.

Specific example embodiments of the present invention will be explained in more detail below with reference to the accompanying schematic figures.

BRIEF DESCRIPTION OF THE DRAWINGS

FIG. 2 shows a vehicle driving ahead, which is avoiding an obstacle, and a vehicle behind the vehicle in front.

DETAILED DESCRIPTION OF EXAMPLE EMBODIMENTS

Generally, obstacles on the roadway represent some of the greatest challenges for vehicles, especially for automated vehicles. Therefore, for vehicles of this kind, vehicle sensor systems are provided which can detect objects above a particular minimum size as early as from a defined distance away, and early enough to prevent a collision. However, doing so becomes more difficult when there is no clear view between the vehicle and the object when one vehicle is following another vehicle.

In heavy traffic, it is almost impossible to avoid following a vehicle in front. In addition, automated vehicles can use vehicles in front to identify a clear route portion, and can try to follow the vehicle within the route portion or on a roadway. In this case, the vehicle behind could work on the assumption that the vehicle in front has checked the upcoming route portion to see if it is clear. In particular, a vehicle could assume that the vehicle in front avoids obstacles on the roadway such as objects or potholes, initiates suitable braking maneuvers, or communicates a warning, for example via warning lights. However, behavior of this kind need not occur.

If a vehicle in front drives over an object on the roadway, in some cases the object does not become visible to the vehicle behind until it appears under or behind the vehicle in front. In some circumstances, this may be too late for the vehicle behind to react adequately.

Therefore, it is provided that a vehicle has an observation apparatus (monitoring apparatus) that uses vehicle sensors such as a camera, LiDAR, or radar to detect potential obstacles on the route, such as objects or potholes, by observing the vehicle in front. In this case, the general assumption is that the obstacles being observed are of such a size that driving over them should be avoided, and that they are hidden by the vehicle in front at least in part and/or temporarily.

The vehicle in front being watched is preferably the vehicle immediately in front. In configurations, however, vehicles even further ahead can also be observed, and even a plurality of vehicles could be observed at the same time if they are visible to the vehicle behind (e.g., when on a slope or due to the size thereof).

Below, two different forms of observations will be described in more detail. In the first case, it is detected that a vehicle in front is actually driving over an obstacle. In the second case, it is detected that a vehicle in front starts a brief avoidance maneuver in order to drive around an obstacle.

Figure 1:
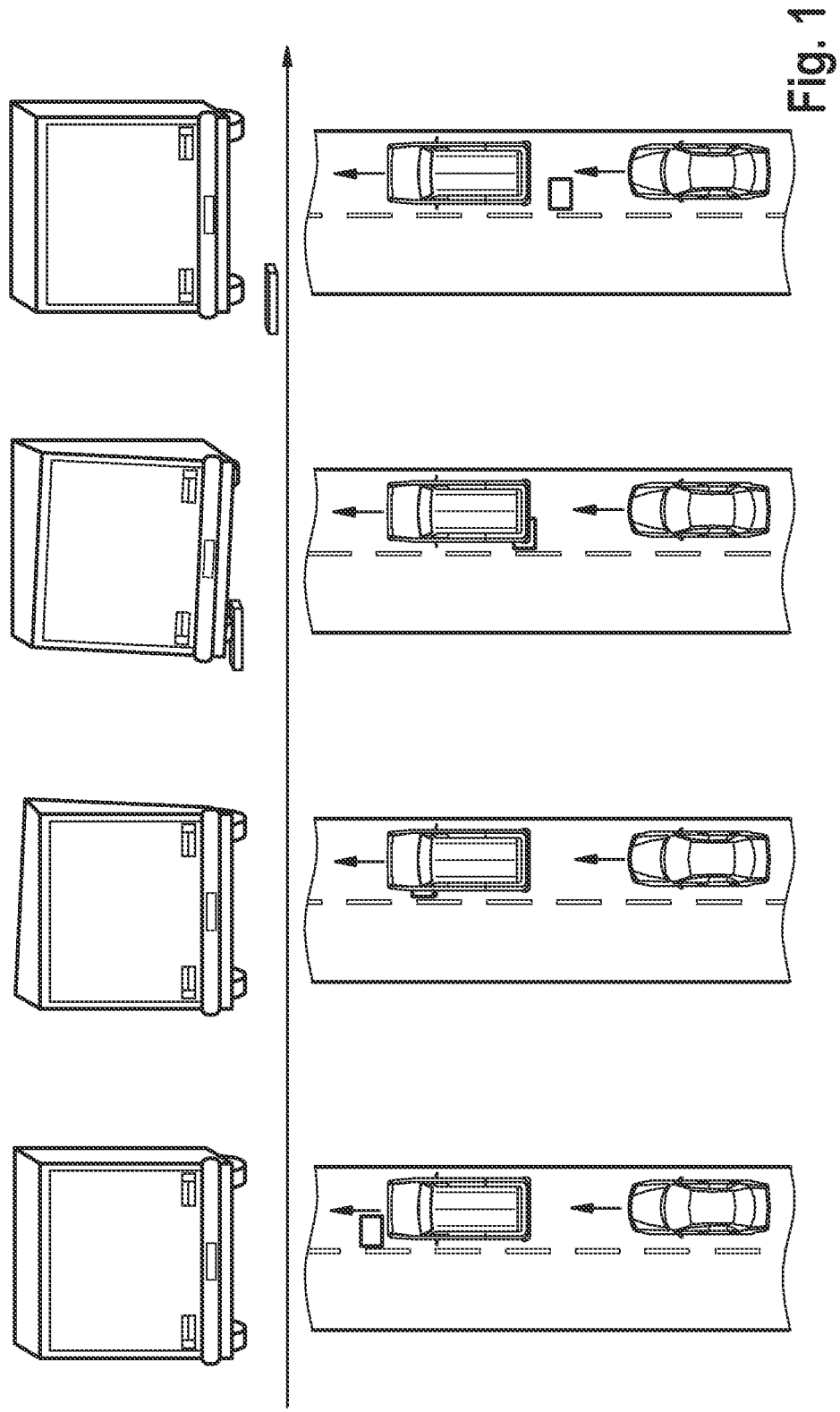
FIG. 1 shows a vehicle driving ahead, which is driving over an obstacle, and a vehicle behind the vehicle in front.

FIG. 1 schematically shows a vehicle driving ahead, which is driving over an obstacle, and a vehicle behind the vehicle in front.

In the driving scene shown, it can be seen, below the arrow axis from left to right, how a vehicle in front approaches an obstacle, first drives over it with its front left wheel, then drives over it with its back left wheel, and eventually the obstacle is located between the vehicle in front and the vehicle behind.

Above the arrow axis there is, in each case, a view of the vehicle in front from behind. Whereas the vehicle in the scene of the first and last images does not show any peculiarities, a one-sided pitch motion of the vehicle toward the front left can be seen in the second scene and a one-sided pitch motion of the vehicle toward the back left can be seen in the third scene.

Using its monitoring device or its vehicle sensors, the vehicle behind detects this pitch motion and checks or analyzes it. Depending on the detected pitch motion of the vehicle in front, an underlying obstacle can then be detected in the vehicle behind. Where applicable, information on where the obstacle is located can also be deduced, for example how far in front it is or how far to the right or left it is in the lane of the vehicle in front, depending on when and where the pitch motion in the vehicle in front was detected. The size of the obstacle can also be deduced depending on how pronounced the pitch motion of the vehicle in front is. The monitoring apparatus can then issue a signal regarding the detected obstacle, possibly comprising the additional deduced information on the obstacle.

A suitable reaction to the detected obstacle can then take place in the vehicle behind. For example, in an automated vehicle a planned trajectory can be changed or an avoidance and/or braking maneuver can be initiated. Additionally or alternatively, a warning can be issued to the driver in a vehicle.

In an advantageous embodiment, the monitoring apparatus is able to detect pitch motions that relate to the entire front end and/or the entire rear end of the vehicle (referred to below as two-sided pitch motions). Two-sided pitch motions of this kind can occur, for example, when a vehicle drives over a relatively large obstacle with its front right wheel and front left wheel at the same time, or with its back right wheel and back left wheel at the same time. The difference between one-sided pitch motions and two-sided pitch motions is crucial for the vehicle behind since an avoidance maneuver toward the other side of the lane may be an option in the event of a one-sided pitch motion whereas this option is generally not possible in the event of a two-sided pitch motion. Instead, in the event of a two-sided pitch motion, a more radical maneuver can be displayed, for example a lane change or emergency braking.

Figure 4:
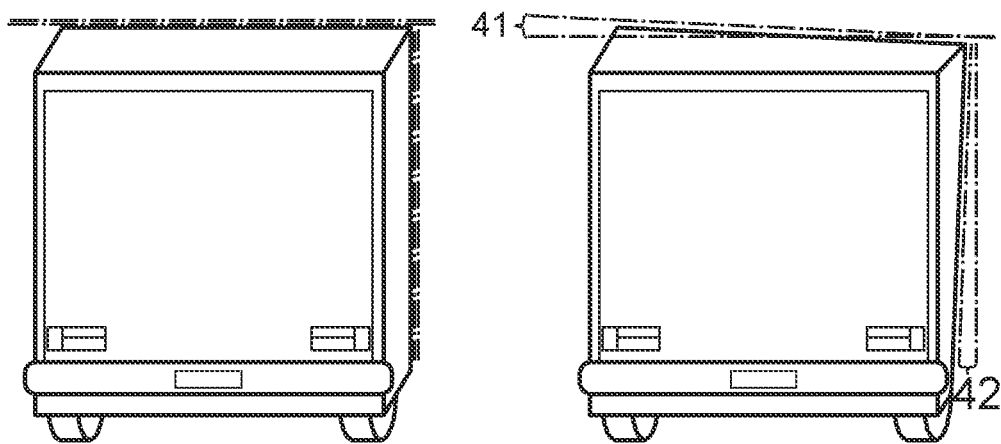
FIG. 4 shows a vertical and horizontal displacement due to a pitch motion of a vehicle when driving over an obstacle.

FIG. 4 shows a vertical and horizontal displacement due to a pitch motion of a vehicle when driving over an obstacle.

Observing the pitch motion of the vehicle in front allows the monitoring apparatus to indirectly detect an obstacle on the roadway. For this purpose, the monitoring apparatus analyzes sensor signals from vehicle sensors, which collect information on the vehicle in front. A one-sided position change of an axle of the vehicle in front can be seen in a characteristic pitch motion of the vehicle (right-hand side in FIG. 4), which can be detected by making a comparison with sensor data from before the position change or before the pitch motion (left-hand side in FIG. 4).

Typically, driving over an obstacle leads to a pitch motion that can be seen in a characteristic, often abrupt vertical position change of a vehicle roof (41 in FIG. 4), for example of a visible edge on the vehicle roof, and/or in a characteristic horizontal position change on the right-hand or left-hand side of the vehicle (42 in FIG. 4). These position changes can be detected by the monitoring apparatus and the presence of a corresponding obstacle can be detected on that basis. In the process, the position changes can occur on both sides of the vehicle and on each axle of the vehicle. In particular configurations, on the basis of the detected position changes, the monitoring apparatus can differentiate, for example, between a pitch motion upward caused by driving over an object and a pitch motion downward caused by driving over a pothole, since this distinction can also form the basis for different optimal reactions.

In a particular configuration of the above-described methods, to detect and analyze the characteristic position changes, the monitoring apparatus can use a machine learning algorithm, such as a neural network (e.g., a convolutional neural network or recurrent neural network), that has been trained accordingly with suitable data.

In a possible extension of the above-described methods, the monitoring apparatus can additionally issue a confidence value or a probability of how certain it is, according to its calculations, that an obstacle is present on the basis of the registered position changes. This information can be used as a basis for establishing a suitable reaction, and can be output by the monitoring apparatus to, for example, a behavior or trajectory planner for this purpose.

FIG. 2 shows a vehicle driving ahead, which is avoiding an obstacle, and a vehicle behind the vehicle in front.

In the driving scene shown, it can be seen, from left to right, how a vehicle in front approaches an obstacle, (very briefly) avoids it by a steering maneuver to the left, then drives past the obstacle, and lastly slips back into the middle of its lane by a steering maneuver to the right. In the first scene, and possibly in the second scene, the vehicle behind cannot detect the obstacle directly. Direct detection in the third and fourth scene is potentially already too late for a suitable reaction.

In this second case, using a monitoring apparatus the vehicle behind monitors a vehicle in front for brief avoidance maneuvers to the right or left. In the process, maneuvers that exceed a particular sideways velocity and/or acceleration or do not exceed a particular sideways shift in the trajectory of the vehicle are in particular registered as being characteristic. The corresponding threshold values can be pre-configured. If a characteristic avoidance maneuver is detected, the monitoring apparatus can conclude that an obstacle is present. In addition, information can be deduced regarding how far away the obstacle is and where it is located in the lane (for example to the right, to the left, in the middle), depending on the time, type, and direction of the avoidance maneuver.

A suitable reaction to the detected obstacle can then take place in the vehicle behind. For example, in an automated vehicle a planned trajectory can be changed or an avoidance and/or braking maneuver can be initiated. Additionally or alternatively, a warning can be issued to the driver in a vehicle.

Observing the avoidance maneuver of the vehicle in front allows the monitoring apparatus to indirectly detect an obstacle on the roadway. For this purpose, the monitoring apparatus analyzes sensor signals from vehicle sensors, which collect information on the vehicle in front. In the process, the sensor systems of the vehicle can transmit raw or pre-processed sensor data to the monitoring apparatus of the same vehicle. The sensor data can be of different types, in particular from environment sensors, for example camera images, LiDAR point clouds, radar signatures, audio information, ultrasonic data, etc.

Figure 5:
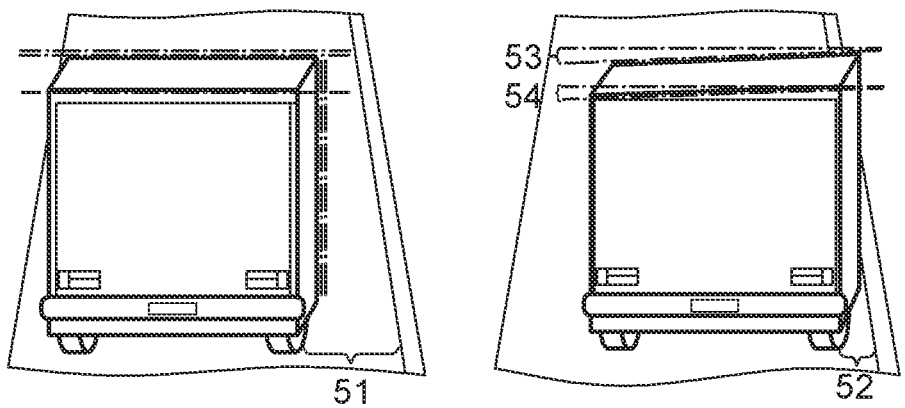
FIG. 5 shows a change to the distance between a vehicle and the edge of the roadway, and a suspension compression due to a yaw motion during an avoidance maneuver of the vehicle.

FIG. 5 shows a change to the distance between a vehicle and the edge of the roadway, and a suspension compression due to a yaw motion during an avoidance maneuver of the vehicle.

A characteristic avoidance maneuver of the vehicle in front can be detected in particular by detecting a change to the relative position of the vehicle in the lane, for example a change to the distance between the vehicle and road markings such as edge or center lines (51, 52 in FIG. 5).

Additionally or alternatively, on the basis of the analyzed sensor data, the monitoring apparatus can determine a yaw rate of a yaw motion of the vehicle in front by analyzing the relative position of the back left and front left corner of the vehicle (53, 54 in FIG. 5) or accordingly of the back right and front right corner. In addition, a characteristic avoidance maneuver can also be detected by detecting a pitch motion over the entire length of the vehicle, triggered by a hard steering maneuver that pushes the vehicle deep into the suspension on one side. In all types of avoidance maneuver detection, the corresponding variables are preferably analyzed over time.

In a particular configuration of the above-described methods, to detect and analyze the avoidance maneuvers, the monitoring apparatus can use a machine learning algorithm, such as a neural network (e.g., a convolutional neural network or recurrent neural network), that has been trained accordingly with suitable data.

In a possible extension of the above-described methods, the monitoring apparatus can additionally issue a confidence value or a probability of how certain it is, according to its calculations, that an obstacle is present on the basis of the registered avoidance maneuver. This information can be used as a basis for establishing a suitable reaction, and can be output by the monitoring apparatus to, for example, a behavior or trajectory planner for this purpose.

Figure 3:
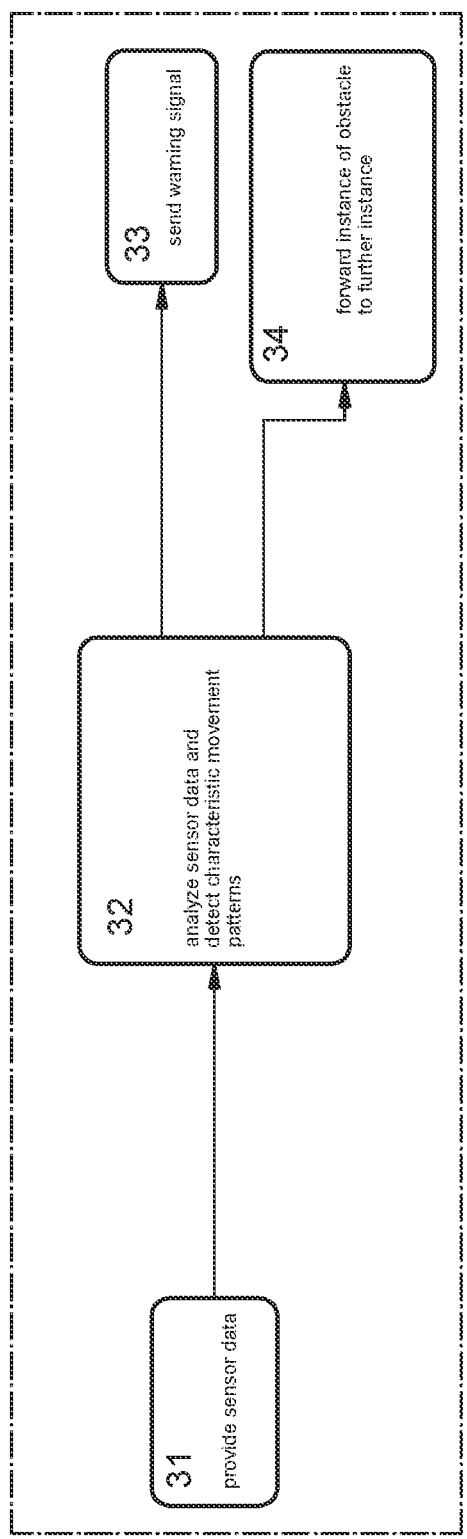
FIG. 3 shows an example sequence of a method for detecting an obstacle on a route and for reacting thereto, in accordance with the present invention.

FIG. 3 shows an example sequence of a method for detecting an obstacle on a route and for reacting thereto.

In a first step 31, sensor data from vehicle sensors, which collect information on a vehicle in front, are provided in the vehicle.

In a second step 32, a monitoring apparatus (in particular a software instance in the vehicle with access to computing and memory resources in the vehicle) analyzes the provided sensor data and detects characteristic movement patterns of the vehicle in front, in particular a pitch motion due to the vehicle driving over an obstacle or movements that are characteristic of an avoidance maneuver due to an obstacle. Depending on the detected movements, the monitoring apparatus determines whether the presence of an obstacle on the roadway can be deduced therefrom.

If an obstacle is detected, the monitoring apparatus in particular initiates suitable reactions. For example, in step 33, the monitoring apparatus can send a warning signal to a driver interface such as a screen or a speaker. Additionally or alternatively, in step 34, information on the obstacle can be forwarded to a further instance, such as a movement or trajectory planning system or to a control unit of the vehicle. Boundary conditions for a suitable maneuver for safety reasons can be determined therein, with a view to avoiding driving over the obstacle. In the process, further boundary conditions to ensure the safety of the vehicle and its surroundings, for example the surroundings and other road users, are in particular also taken into account. As a reaction, avoidance trajectories can be determined, or boundary conditions for the affected, supposedly blocked route portion can be deduced. Boundary conditions of this kind can, for example, be output in the form of a blocked-out two-dimensional surface on the roadway, as an area containing associated costs, or as a set of lines or polygons.

The above-described methods can be used as part of a safety shell for vehicle movements.

In particularly preferred configurations, the above-described methods are implemented by the monitoring apparatus of the vehicle behind monitoring the vehicle in front for signs that it has driven over an obstacle and for signs of an avoidance maneuver due to an obstacle. In the process, sharing this information may be particularly helpful to reliably detect obstacles, for example when it is detected that the vehicle has (at least partly unsuccessfully) attempted to avoid the obstacle and has subsequently driven over it.

What is claimed is:

1. A computer-implemented method for detecting an obstacle on a route ahead of a first vehicle, the method comprising the following steps: recording, by at least one sensor of the first vehicle, information about a change over time in a second vehicle driving ahead on a route of the first vehicle; detecting, by a computer in the first vehicle and depending on the change over time, at least one predefined movement by the second vehicle, the at least one movement including at least one of an evasive maneuver, a pitching motion, and a yaw motion, which the computer of the first vehicle determines corresponds to an avoidance maneuver that has been performed by the second vehicle due to an obstacle or that the second vehicle has driven over the obstacle; determining, by the computer of the first vehicle, presence of the obstacle on the route based on the detected avoidance maneuver performed by the second vehicle or the detection that the second vehicle has driven over the obstacle; and the computer of the first vehicle initiating the first vehicle to perform a measure for protecting the first vehicle and/or the obstacle, depending on the detected obstacle.

2. The method as recited in claim 1, wherein that the second vehicle has driven over the obstacle is detected by the computer depending on the pitch motion.

3. The method as recited in claim 1, wherein
the avoidance maneuver is detected depending on a change, deduced by the computer of the first vehicle from the change over time in the second vehicle, in a relative position of the second vehicle.

4. The method as recited in claim 1, further comprising:
determining, depending on the recorded information, a location of the obstacle, the location including a distance between the first vehicle and the obstacle or a position of the obstacle in a lane, and the initiated measure depends on the determined location.

5. The method as recited in claim 1, wherein the obstacle is roadway damage, including a pothole or an object on a roadway.

6. The method as recited in claim 1, wherein the second vehicle is a vehicle that is driving directly ahead of the first vehicle.

7. The method as recited in claim 1, wherein information is recorded for a plurality of second vehicles, and the obstacle is detected on the route depending on the recorded information for the plurality of second vehicles.

8. The method as recited in claim 1, wherein the first vehicle monitors the second vehicle both for the avoidance maneuver due to the obstacle and to see if the second vehicle drives over the obstacle, and the obstacle is detected depending on the detected avoidance maneuver and the detection that the vehicle has driven over the obstacle.

9. The method as recited in claim 1, wherein the measure includes an automatic steering intervention, and/or an automatic braking intervention, and/or a warning signal to a driver of the first vehicle.

10. The method as recited in claim 1, wherein the at least one sensor includes an environment sensor, and the information on the second vehicle includes a camera image, and/or a LiDAR point cloud, and/or a radar signature, and/or audio information, and/or ultrasonic data.

11. The method as recited in claim 1, wherein the avoidance maneuver is detected by the computer of the first vehicle based on a yaw rate of the second vehicle which is deduced by the computer of the first vehicle.

12. A non-transitory machine-readable storage device on which is stored a computer program for detecting an obstacle on a route ahead of a first vehicle, the computer program, when executed by a computer, causing the computer to perform the following steps:
recording, by at least one sensor of the first vehicle, information about a change over time in a second vehicle driving ahead on a route of the first vehicle;
detecting, by a computer in the first vehicle and depending on the change over time, at least one predefined movement by the second vehicle, the at least one movement including at least one of an evasive maneuver, a pitching motion, and a yaw motion, which the computer of the first vehicle determines corresponds to an avoidance maneuver that has been performed by the second vehicle due to an obstacle or that the second vehicle has driven over the obstacle;
determining, by the computer of the first vehicle, presence of the obstacle on the route based on the detected avoidance maneuver performed by the second vehicle or the detection that the second vehicle has driven over the obstacle;
the computer of the first vehicle initiating the first vehicle to perform a measure for protecting the first vehicle and/or the obstacle, depending on the detected obstacle.

13. A first vehicle configured to detect an obstacle on a route ahead of the first vehicle, the first vehicle comprising:
at least one sensor, the at least one sensor configured to record information about a change over time in a second vehicle driving ahead on a route of the first vehicle; and
a computer configured to:
detect, depending on the change over time, at least one predefined movement by the second vehicle, the at least one movement including at least one of an evasive maneuver, a pitching motion, and a yaw motion, which the computer of the first vehicle determines corresponds to an avoidance maneuver that has been performed by the second vehicle due to an obstacle or that the second vehicle has driven over the obstacle,
determine presence of the obstacle on the route based on the detected avoidance maneuver performed by the second vehicle or the detection that the first vehicle has driven over the obstacle, and
initiate the first vehicle to perform a measure for protecting the first vehicle and/or the obstacle, depending on the detected obstacle.

14. A computer-implemented method of a first ego vehicle, the method comprising:
recording, with a sensor system of the first vehicle, sensor information regarding a leading vehicle that is in front of the first vehicle;
detecting a change over time in the leading vehicle based on the recorded sensor information;
based on the detected change over time in the leading vehicle, determining at least one of that the leading vehicle has conducted an evasive maneuver, that the leading vehicle has undergone a pitching motion, and that the leading vehicle has undergone a yaw motion;
based on the determination regarding the leading vehicle, determining by the first vehicle (a) that an obstacle, a view of which, by the first vehicle, is blocked by the leading vehicle, is present and (b) position information of the obstacle; and performing a protection action for protecting at least one of (a) the first vehicle from the obstacle and (b) the obstacle from the first vehicle.

15. The method as recited in claim 14, wherein the detection of the change over time is a detection of a change in a difference between two corner regions of the leading vehicle.

16. The method as recited in claim 14, wherein the determination regarding the leading vehicle is that the vehicle has conducted the evasive maneuver and is made based on a detection of the yaw motion.

17. The method as recited in claim 14, wherein the pitching motion of the leading vehicle is determined based on a changed to height of a particular part of the leading vehicle.

* * * * *